United States Patent Office 3,035,949
Patented May 22, 1962

3,035,949
HYDROCARBYLPHOSPHINODECABORANES AND FUEL COMPOSITIONS CONTAINING THEM
George W. Parshall, Newark, Del., assignor to E. I. du Pont de Nemours and Company, Wilmington, Del., a corporation of Delaware
No Drawing. Filed May 6, 1958, Ser. No. 733,273
13 Claims. (Cl. 149—22)

This invention relates to new derivatives of decaborane. More particularly, it relates to derivatives of decaborane having phosphorus-boron bonds, and to a method for their preparation.

Decaborane is of considerable interest as a high energy fuel. However, in certain applications in the field of fuels, it is desirable that decaborane be modified to provide special characteristics such as, for example, to improve the ease of handling it in fuel compositions, and to provide improved combustion characteristics.

It is an object of this invention to provide new decaborane derivatives and processes for their preparation. A further object is to provide new decaborane derivatives having phosphorus-boron bonds and methods for their preparation. A still further object is to provide useful products which are derivatives of decaborane. Other objects will appear hereinafter.

These and other objects of this invention are obtained by providing compounds of the general formulas $$(R''_2P)_{x} \cdot B_{10}H_{12}$$
$$\overset{R'}{|}$$

and $$[R''\overset{R'}{\underset{|}{P}}-R'''-\overset{R'}{\underset{|}{P}}-R'' \cdot B_{10}H_{12}]_n$$

wherein R' is hydrogen, alkyl, cycloalkyl, aryl, or alkenyl; R'' is alkyl, cycloalkyl, aryl or alkenyl; R''' is alkylene or arylene; and n is an integer greater than 1, that is 2, 3, 4 and up.

The new compounds of this invention are selected hydrocarbylphosphinodecaboranes and are prepared by reacting decaborane with a monophosphine or a diphosphine containing not more than one hydrogen on each phosphorus atom. This process is illustrated by the following general equations:

(a) 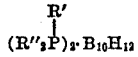
$$2R''-\overset{R'}{\underset{|}{P}}-R'' + B_{10}H_{14} \longrightarrow (R''_2P)_{x} \cdot B_{10}H_{12} + H_2$$

(b) 
$$nR''-\overset{R'}{\underset{|}{P}}-R'''-\overset{R'}{\underset{|}{P}}-R'' + nB_{10}H_{14} \longrightarrow$$
$$[R''-\overset{R'}{\underset{|}{P}}-R'''-\overset{R'}{\underset{|}{P}}-R'' \cdot B_{10}H_{12}]_n + nH_2$$

where R', R'', R''', and n have the meanings hereinbefore defined.

In view of the greater availability of the starting materials from which they are made, i.e., the mono- and diphosphines, the hydrocarbylphosphinodecaboranes of the above formulas in which the hydrocarbon radicals R', R'' and R''' contain up to and including 8 carbon atoms are preferred.

The process is conveniently carried out by adding a mono- or diphosphine containing not more than one hydrogen on each phosphorus atom, e.g., diethylphosphine, or P,P,P',P'-tetraethylethylenediphosphine, to decaborane, preferably in a solvent such as, for instance, benzene; and maintaining the mixture at a temperature between 0° and 175° C. until there is no further reaction as evidenced by the cessation of evolution of hydrogen. The resulting hydrocarbylphosphinodecaborane is separated from the solvent and any unreacted starting materials by filtration or by evaportion at subatmospheric pressures.

The proportions of the phosphine and the decaborane used in the process of this invention are not critical. However, one mole of decaborane is generally employed for each two moles of a monophosphine or for one mole of a diphosphine. An excess of the phosphine, e.g., up to 100% excess, can be used if desired but an excess of decaborane is undesirable because the separation of excess decaborane by sublimation proceeds slowly.

The reaction between the hydrocarbylphosphine and decaborane takes place at temperatures between about 0° and 175° C. However, it is preferred to use reaction temperatures between 0° and 100° C. Temperatures above 175° C. are to be avoided because decaborane is unstable above that temperature.

The reaction pressure is not critical since the reaction takes place at sub-atmospheric pressure, e.g., at a pressure of 0.01 mm. of mercury or lower up to super-atmospheric pressures. Super-atmospheric pressures are particularly useful when volatile hydrocarbylphosphines are being employed. In this case, pressures of up to 35 atmospheres are useful.

Reaction takes place between the hydrocarbylphosphine and the decaborane in the absence of any solvent. However, it is preferred to use an inert solvent such as an aromatic hydrocarbon, e.g., benzene, toluene, or xylene, or an aliphatic hydrocarbon in which decaborane is soluble, e.g., 2,2-dimethylbutane.

The reaction between the hydrocarbylphosphine and decaborane is usually completed in from one-half to one hour. The liberation of hydrogen is usually complete within this period and the cessation of an increase in pressure is a convenient end-point for the reaction. However, longer times, e.g., periods up to 24 hours or more can be used, but they are not usually necessary.

The product and process of this invention are illustrated in further detail in the following examples in which the proportions of ingredients are expressed in parts by weight unless otherwise noted.

EXAMPLE I

*Reaction of Diethylphosphine With Decaborane*

A retort having a capacity of about 400 parts of water and fitted with a side-arm having a stopcock, is charged with 0.299 part (2.44 millimoles) of decaborane. The arm of the retort is sealed to a 760 mm. open-end manometer. The bulb of the retort is cooled to −190° C. and is evacuated to 0.05 mm. of mercury. Diethylphosphine (0.440 part; 4.88 millimoles) is distilled into the retort, the stopcock is closed and the system is allowed to warm to room temperature. As the retort warms, the diethylphosphine melts and flows onto the decaborane. The mixture becomes orange and vigorous gas evolution occurs. Over a period of about one hour the pressure rises to 113 mm. of mercury which corresponds to the evolution of 2.46 millimoles of hydrogen. The system is then evacuated to 0.03 mm. for 16 hours. At the end of this period, the residue in the retort is a viscous yellow liquid having a refractive index, $n_D^{25}$, of 1.6080 and is bis(diethylphosphine)-decaborane. It is soluble in benzene but insoluble in ethanol, and it has the formula $$[(C_2H_5)_2PH]_2 \cdot B_{10}H_{12}$$

*Analysis.*—Calc'd for $C_8H_{34}B_{10}P_2$: C, 31.97%; H, 11.40%; B, 36.10%; P, 20.62%. Found: C, 31.50%; H, 11.05%; B, 34.08%; P, 21.16%.

EXAMPLE II

*Reaction of Tri-n-butylphosphine With Decaborane*

A round-bottom reaction vessel having a capacity of about 500 parts of water and fitted with a magnetic stirrer, thermometer, and dropping funnel with a pressure equalizing side-arm, is charged with 1.555 parts (12.72 millimoles) of decaborane. The dropping funnel is charged with 5.15 parts (25.5 millimoles) of tri-n-butylphosphine and then sealed with a T-tube to a vacuum manifold and a 760 mm. closed-end manometer. The reaction vessel is cooled to −190° C. and evacuated to 0.05 mm. of mercury. Twenty parts of benzene is distilled into the reaction vessel and the system is sealed off from the vacuum manifold. The vessel is allowed to warm to 26.5° C. and the tri-n-butylphosphine is added to the decaborane solution over a period of 27 minutes. The temperature of the reaction mixture increases to 37° C. and 12.7 millimoles of hydrogen (identified by mass spectrometric analysis) is evolved. The benzene is removed by distillation under reduced pressure and the residual white crystalline bis-(tri-n-butylphosphine)decaborane is crushed and dried at 0.05 mm. for 16 hours. It has a melting point of 84–90° C.

Analysis.—Calc'd for $C_{24}H_{66}B_{10}P_2$: C, 54.91%; H, 12.67%; B, 20.61%; P, 11.80%; M.W. 525. Found: C, 54.58%; H, 12.62%; B, 20.43%; P, 12.15%; M.W. 494 (determined cryoscopically in benzene).

A sample of the bis-(tri-n-butylphosphine)decaborane is heated at 100° C. under reduced pressure (0.02 mm.) for 2.45 hours. The sample melts and then recrystallizes to light yellow crystals melting at 109–116° C. No volatile products are evolved and the analysis remains essentially unchanged (P=12.07%). A similar increase in melting point takes place when the bis(tri-n-butylphosphine)decaborane is recrystallized from 2,2-dimethylbutane. The resulting white cubical crystals melt at 115–117° C.

EXAMPLE III

*Reaction of Triphenylphosphine With Decaborane*

A solution of 3.94 parts (15 millimoles) of tri-phenylphosphine in 15 parts of benzene is added to a solution of .91 part (7.5 millimoles) of decaborane in 10 parts of benzene over a period of one hour in a closed reaction vessel which had been evacuated. The reaction mixture becomes slightly yellow and vigorous hydrogen evolution occurs. The powdery white solid which separates is filtered from the reaction mixture and washed with 25 parts of 2,2-dimethylbutane. After drying, there is obtained 4.4 parts (corresponding to a yield of 91%) of bis(triphenylphosphine)decabroane melting at 223–241° C. Recrystallization from benzene gives a white microcrystalline product which does not melt below 400° C. although it becomes somewhat yellow above 250° C., and which appears to have crystallized with one mole of benzene.

Analysis.—Calc'd for $C_{36}H_{42}B_{10}P_2 \cdot C_6H_6$: C, 69.77%; H, 6.69%; B, 14.96%; P, 8.57%. Found: C, 70.58%; 70.86%; H, 6.83%; 6.88%; B, 14.60%; P, 7.73%.

EXAMPLE IV

*Reaction of P,P,P',P'-tetraethylethylenediphosphine With Decaborane*

A solution of 0.386 part (3.15 millimoles) of decaborane in 5 parts of benzene is stirred at room temperature as 0.651 part (3.15 millimoles) of P,P,P',P'-tetraethylethylenediphosphine is added dropwise. Vigorous hydrogen evolution occurs and viscous orange liquid separates from the reaction mixture. The precipitate becomes colorless as the reaction proceeds. After a total reaction time of one hour, the solvent is removed by evaporation followed by drying the residue at 100° C. and 0.02 mm. of mercury for one hour. The resulting product is a fluffy white solid polymer which is soluble in acetone and dimethyl sulfoxide, but is insoluble in tetrahydrofuran, dioxane, ethyl acetate, xylene and 2,2-dimethylbutane. The polymer softens at 65° C. and becomes sticky at 90° C. It appears to be stable in air at temperatures up to 300° C. although crosslinking and hardening appear to occur on prolonged heating, i.e., on heating for one hour at 150° C. The polymer has the formula $$[(C_2H_5)_2PCH_2CH_2P(C_2H_5)_2 \cdot B_{10}H_{12}]_n$$

Analysis.—Calc'd for $(C_{10}H_{36}B_{10}P_2)_n$: C, 36.77%; H, 11.11%; B, 33.13%; P, 18.97%; M.W. $327_n$. Found: C, 36.48%; H, 10.86%; B, 33.65%; P, 18.66%; M.W., 740, 750 (determined ebullioscopically in acetone).

The molecular weight found by the ebullioscopic method in acetone solution corresponds to a polymer of 2–3 units. This value is considered a minimum figure since bis(tri-n-butylphosphine)decaborane decomposes to some extent in boiling acetone.

Another sample of polymer prepared as described in Example IV except that the decaborane solution is added to a solution of P,P,P',P'-diethylethylenediphosphine in benzene is found to give stable solutions in dimethyl sulfoxide. The inherent viscosity of the polymer as determined in a 0.5% solution in dimethyl sulfoxide at 25° C. is 0.08.

EXAMPLE V

*Poly(P,P,P',P'-Tetraethylethylenediphosphine-Decaborane) Fuel Composition*

A mixture of 70 parts of the poly(P,P,P',P'-tetraethylethylenediphosphine-decaborane) of Example IV and 500 parts of sodium nitrate is prepared by grinding the two materials together in a mortar. The mixture is not detonated by a sharp hammer blow and is apparently unaffected when heated to 200° C. in a sealed glass tube. The mixture does not ignite when the tube is heated over an open flame until the tube softens. However, smooth rapid combustion occurs when the mixture is ignited with a hot wire. In view of these properties, this composition is useful as a rocket propellant.

EXAMPLE VI

*Poly(P,P,P',P'-Tetraethylethylenediphosphine-Decaborane) Fuel Composition*

A mixture of 0.23 part of poly(P,P,P',P'-tetraethylethylenediphosphine-decaborane) and 1.56 parts of potassium perchlorate is blended in a mortar to form a composition that is not shock-sensitive and which can be compressed to brittle objects. The mixture can be heated in air up to 280° C. with no apparent change but it turns gray at 285° C. and tan at 315° C. without melting. When ignited with a red-hot glass rod, the mixture burns with an instantaneous flash.

EXAMPLE VII

*Bis(Tri-n-Butylphosphine)Decaborane Fuel Composition*

A mixture of 0.57 part of the the bis(tri-n-butylphosphine)decaborane of Example II and 3.8 parts of potassium perchlorate is thoroughly blended in a mortar. The resulting mixture can be compressed to a white waxy solid. The mixture is not detonated by a sharp hammer blow or by heating to 320° C. in air. The mixture softens at 110° due to the melting of the bis(tri-n-butylphosphine)decaborane but does not discolor until a temperature of 303° C. is reached. The mixture burns rapidly and smoothly when ignited by a red-hot glass rod.

EXAMPLE VIII

*Bis(Tri - n - Butylphosphine)Decaborane - poly(P,P,P',P'-Tetraethylethylenediphosphine-Decaborane) Fuel Composition*

A mixture of 1.0 part of the fuel composition of Example VI and 0.45 part of the fuel composition of Example VII is blended uniformly in a mortar. The resulting composition contains 0.13 part of poly(P,P,P',P'-tetraethylethylenediphosphine-decaborane), 0.05 part of bis-(tri-n-butylphosphine)decaborane, and 1.27 parts of potassium perchlorate. The blend is not shock-sensitive, and it can be compressed to objects that are only slightly brittle. The blend softens at 110° C. but does not discolor until a temperature of 300° C. is reached. When ignited by a red-hot glass rod, the blend burns in a rapid controlled manner; not as an instantaneous flash as does the composition of Example VI.

Examples I–IV have illustrated the process and products of this invention by specific reference to the reaction of certain hydrocarbylphosphines and -diphosphines with decaborane. However, any hydrocarbylphosphine or -diphosphine in which the hydrocarbyl group is selected from alkyl, cycloalkyl, aryl, or alkenyl and having not more than one hydrogen on each phosphorus atom can be used. More specifically, dialkyl, trialkyl, dicycloalkyl, tricycloalkyl, diaryl, triaryl, dialkenyl, and trialkenyl monophosphines, and alkylene, and arylene diphosphines can be used in the process of this invention. When the specific hydrocarbylphosphines of the examples are replaced by the mono- and diphosphines listed in the following table and reacted with decaborane in the manner described in the examples, the products listed in the second column of the table are formed.

TABLE I

| Hydrocarbylphosphine | Hydrocarbylphosphinodecaborane |
| --- | --- |
| Dimethylphosphine. | bis(Dimethylphosphine)decaborane. |
| Triethylphosphine. | bis(Triethylphosphine)decaborane. |
| Tri-n-octylphosphine. | bis(Tri-n-octylphosphine)decaborane. |
| Dicyclohexylphosphine. | bis(Dicyclohexylphosphine)-decaborane. |
| Triallylphosphine. | bis(Triallylphosphine)decaborane. |
| P,P,P',P'-Tetraethyl-o-phenylenediphosphine. | Poly(P,P,P',P'-tetraethyl-o-phenylenediphosphine-decaborane)$_1$ |
| P,P,P',P'-Tetraethyl-o-xylylenediphosphine. | Poly(P,P,P',P'-tetraethyl-o-xylylenediphosphine-decaborane). |

Phosphines and decaborane used in the process of this invention can be of the ordinary grades available commercially. However, materials of high purity are preferred when polymeric hydrocarbylphosphinodecaboranes are being prepared.

As illustrated by Examples V–VIII, the hydrocarbylphosphinodecaboranes of this invention are especially useful in high energy fuel compositions. Both the monomeric and polymeric hydrocarbylphosphinodecaboranes are useful in fuel compositions containing solid inorganic oxidizing agents such as alkali metal nitrates and perchlorates. The polymeric hydrocarbylphosphinodecaboranes, in addition to acting as fuel ingredients, serve as binders for the compositions. The monomeric derivatives are especially useful in controlling the rate of combustion of the fuel compositions, and in improving the plasticity of the compositions.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A hydrocarbylphosphinodecaborane of the group consisting of compounds having the formula

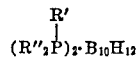

and compounds having the formula

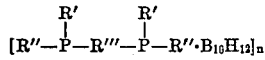

wherein R' is a member of the group consisting of hydrogen, alkyl, cycloalkyl, aryl, and alkenyl, R'' is a member of the group consisting of alkyl, cycloalkyl, aryl, and alkenyl, and R''' is a member of the group consisting of alkylene and arylene, and $n$ is an integer greater than 1.

2. Bis(diethylphosphine)decaborane.
3. Bis(tri-n-butylphosphine)decaborane.
4. Bis(triphenylphosphine)decaborane.
5. Poly(P,P,P',P' - tetraethylethylenediphosphinedecaborane).
6. A fuel composition consisting essentially of a hydrocarbylphosphinodecaborane of claim 1 and a solid inorganic oxidizing agent.
7. A fuel composition consisting essentially of poly(P, P,P',P', - tetraethylethylenediphosphine - decaborane) and sodium nitrate.
8. A fuel composition consisting essentially of poly(P, P,P',P'-tetraethylethylenediphosphine-decaborane and potassium perchlorate.
9. A fuel composition consisting essentially of bis(tri-n-butylphosphine)decaborane and potassium perchlorate.
10. A fuel composition consisting essentially of poly(P, P,P',P' - tetraethylethylenediphosphine - decaborane), bis-(tri-n-butylphosphine)decaborane and potassium perchlorate.
11. Process for preparing hydrocarbylphosphinodecaboranes which comprises mixing at a temperature of from 0° to 175° C. decaborane with a member of a class consisting of monophosphines of the formula

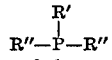

wherein R' is a member of the group consisting of hydrogen, alkyl, cycloalkyl, aryl, and alkenyl, and R'' is a member of the group consisting of alkyl, cycloalkyl, aryl, and alkenyl and diphosphines of the formula

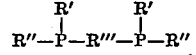

wherein R' and R'' have the same significance as above and R''' is a member of the group consisting of alkylene and arylene, and maintaining the resulting mixture at said temperature until the evolution of hydrogen ceases.

12. Process of claim 11 wherein the reactants are present in the ratios of 1 mole of decaborane to 2 moles of monophosphine and 1 mole of decaborane to 1 mole of diphosphine.

13. Process of claim 12 wherein the reaction is effected in an inert solvent.

References Cited in the file of this patent
UNITED STATES PATENTS

| | | |
| --- | --- | --- |
| 2,643,184 | Cairns | June 23, 1953 |
| 2,663,738 | McCormack | Dec. 22, 1953 |
| 2,682,461 | Hutchison | June 29, 1954 |
| 2,687,437 | Oppegard | Aug. 24, 1954 |